Figure 7:
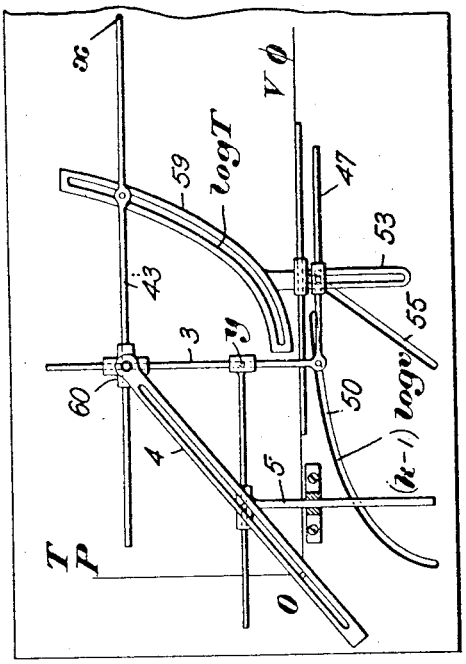

C. W. BERRY.
RECORDER.
APPLICATION FILED MAR. 5, 1910.
1,093,244.
Patented Apr. 14, 1914.
10 SHEETS—SHEET 1.
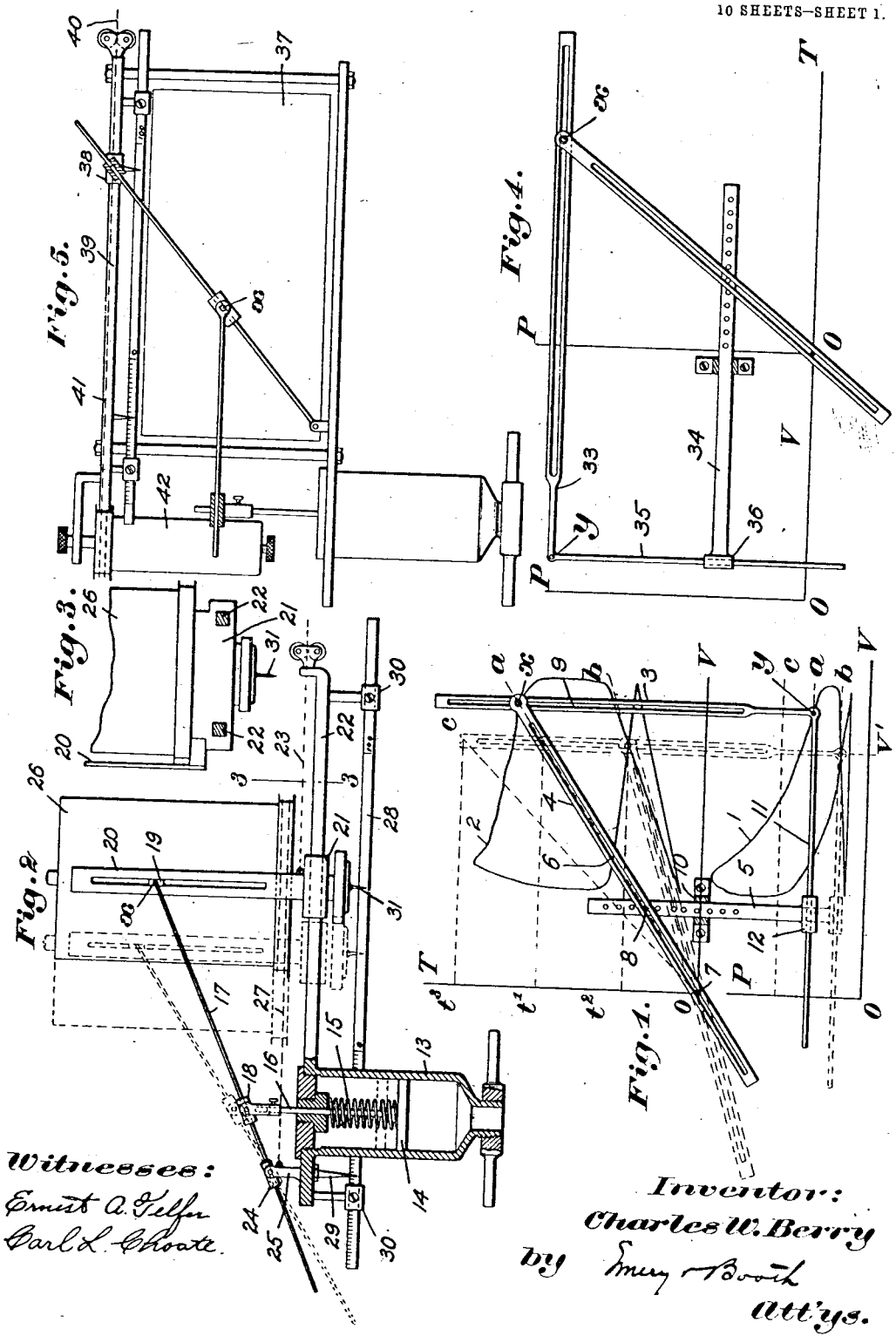
Witnesses:
Ernest A. Telfer
Carl L. Choate
Inventor:
Charles W. Berry
by Emery & Booth
Att'ys.

C. W. BERRY.
RECORDER.
APPLICATION FILED MAR. 5, 1910.

1,093,244.

Patented Apr. 14, 1914.
10 SHEETS—SHEET 2.

Witnesses:

Inventor:
Charles W. Berry
by Emery Booth
att'ys.

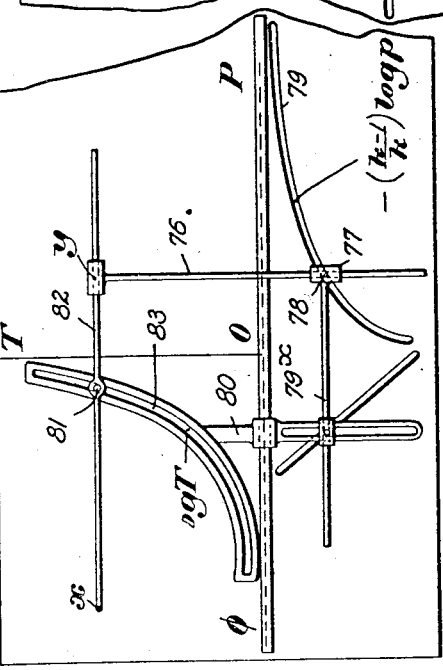
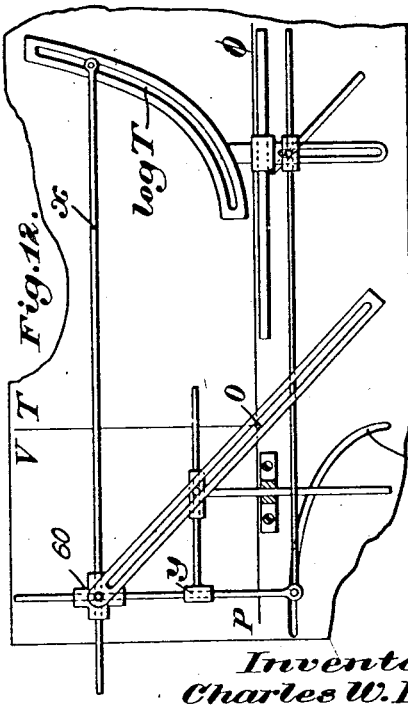

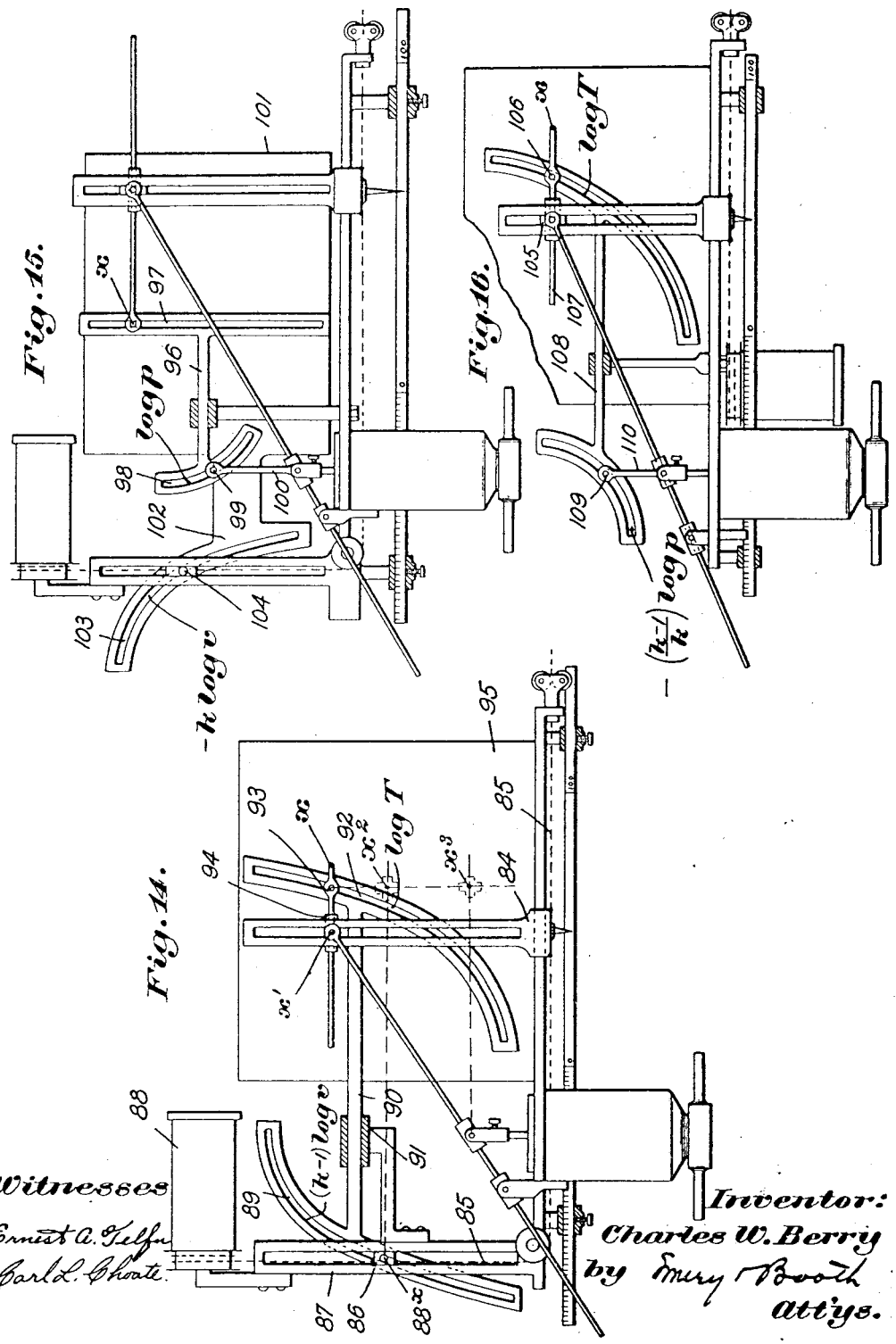

C. W. BERRY.
RECORDER.
APPLICATION FILED MAR. 5, 1910.
1,093,244.
Patented Apr. 14, 1914.
10 SHEETS—SHEET 5.
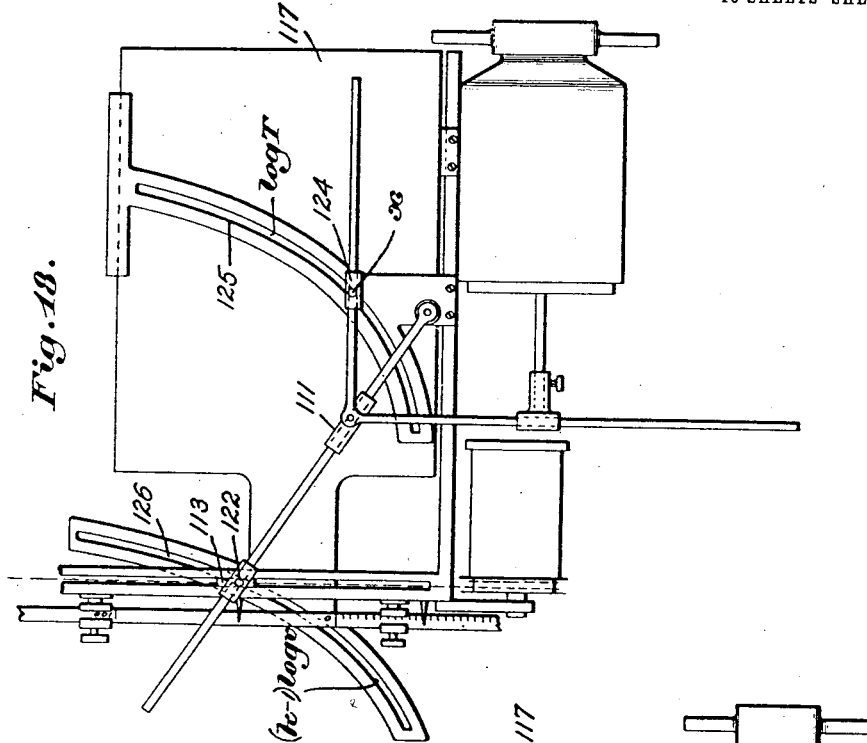
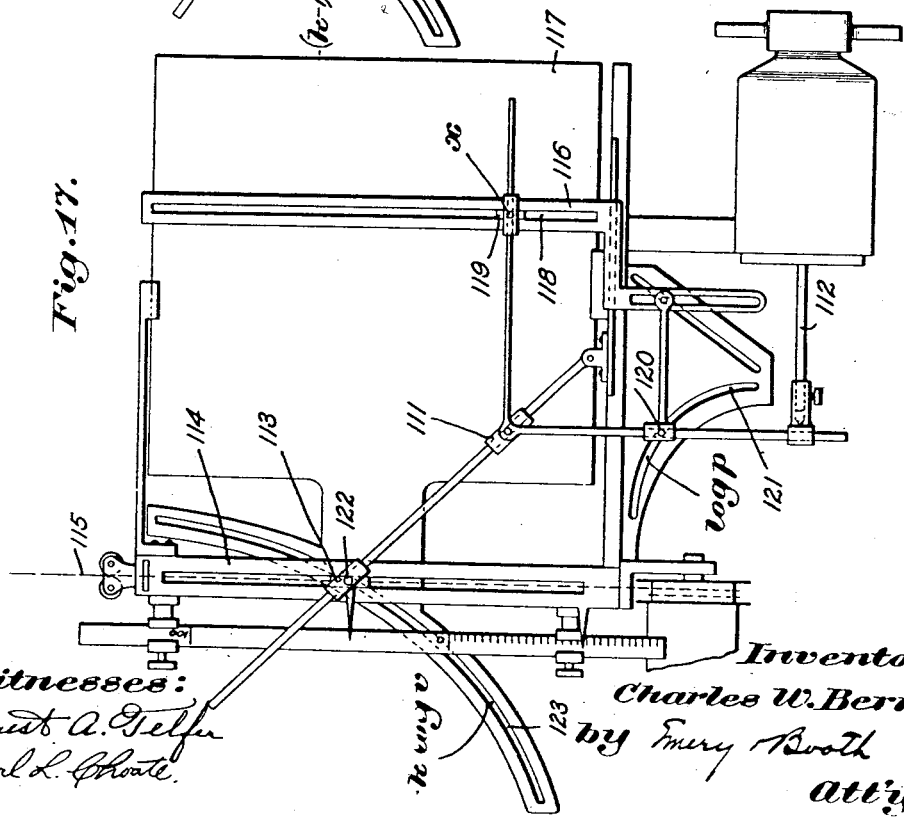
Witnesses:
Ernest A. Telfer
Carl L. Choate
Inventor:
Charles W. Berry
by Emery Booth
Att'ys.

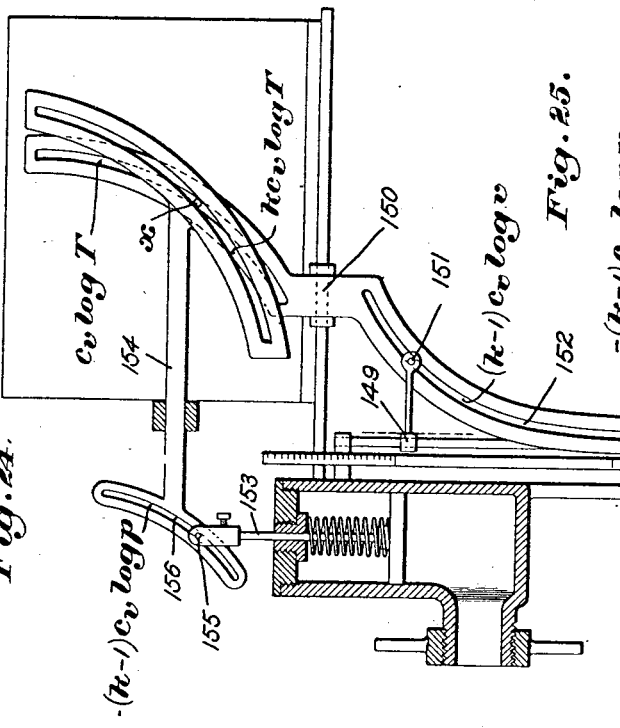
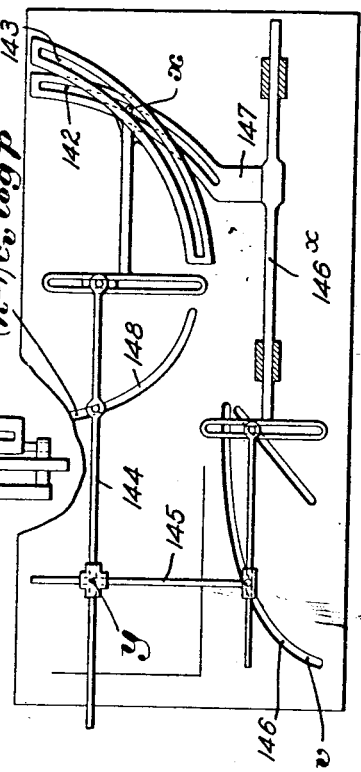
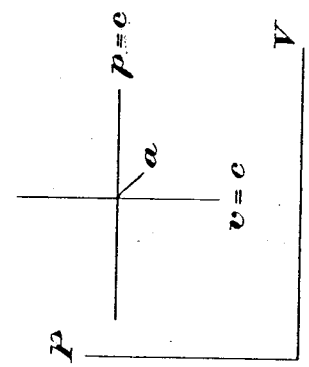
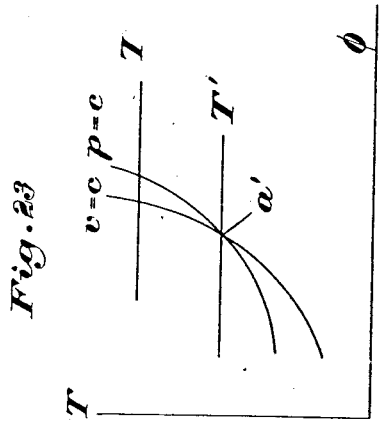

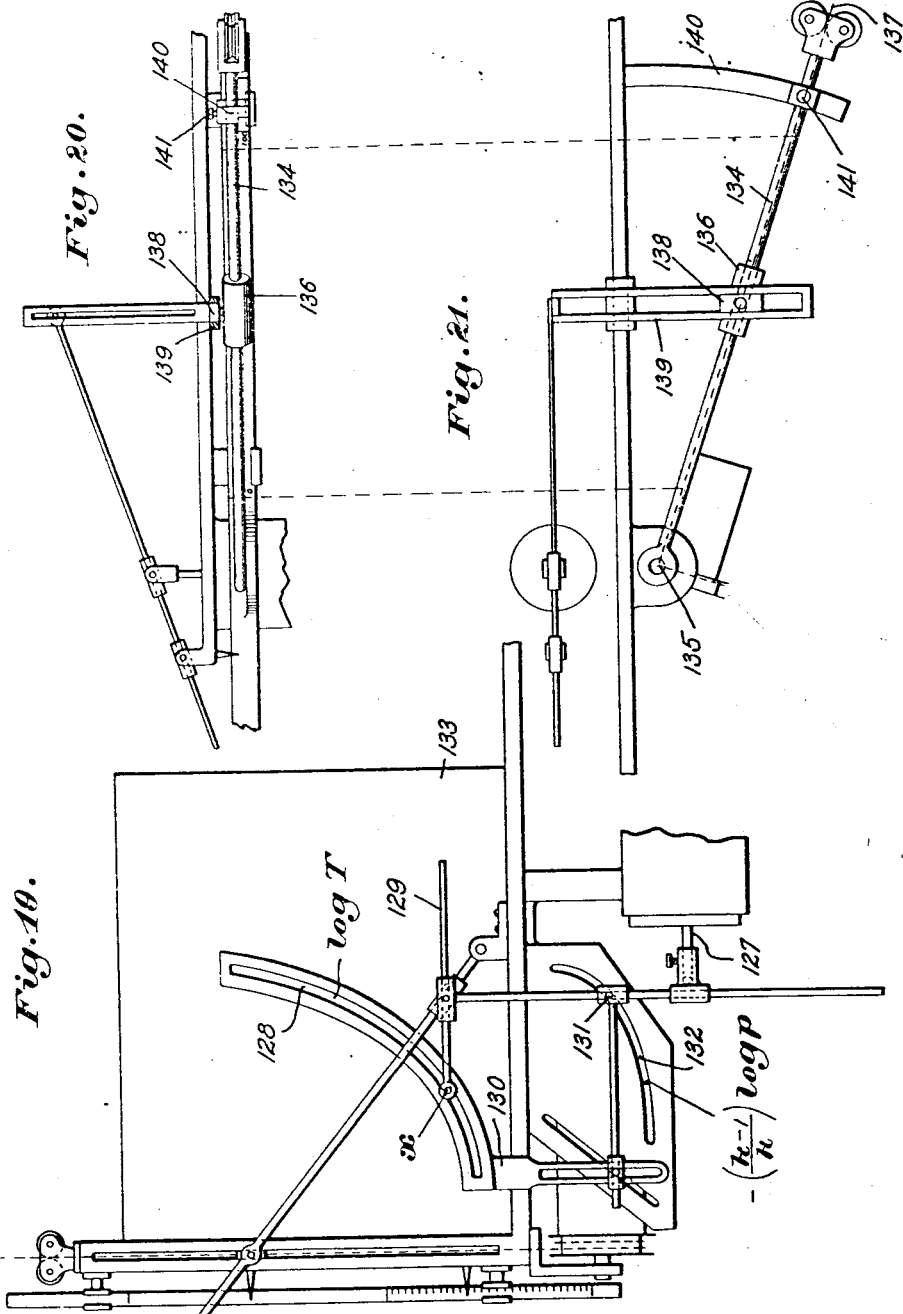

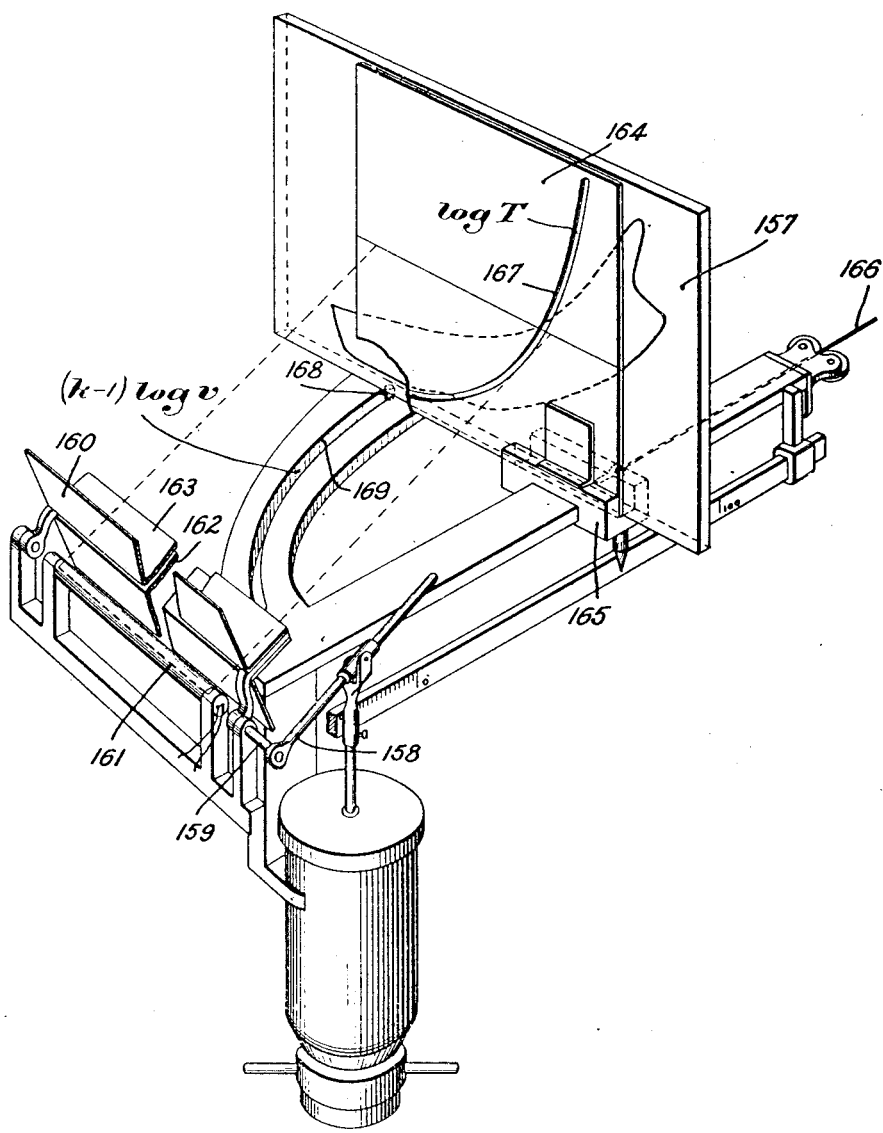

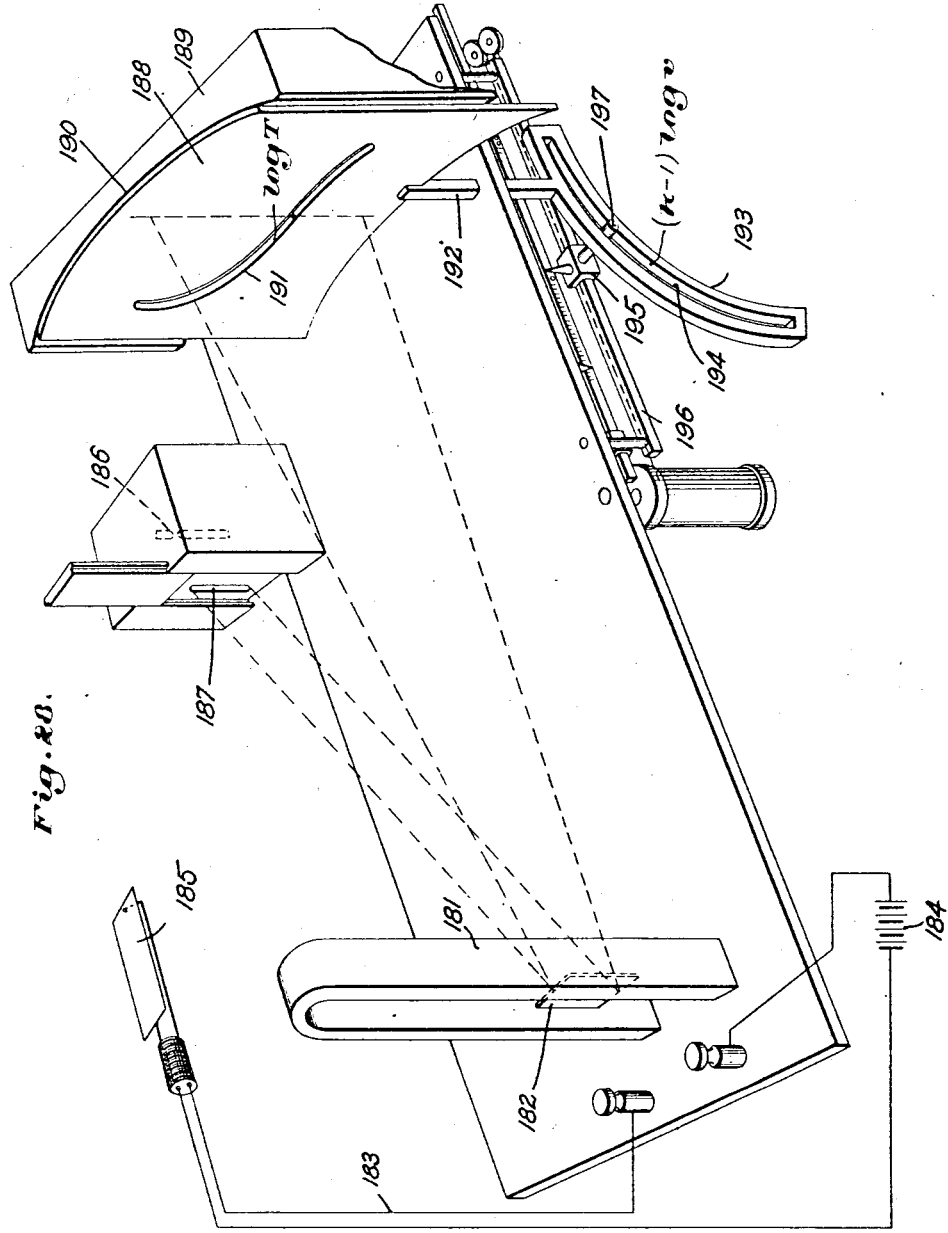

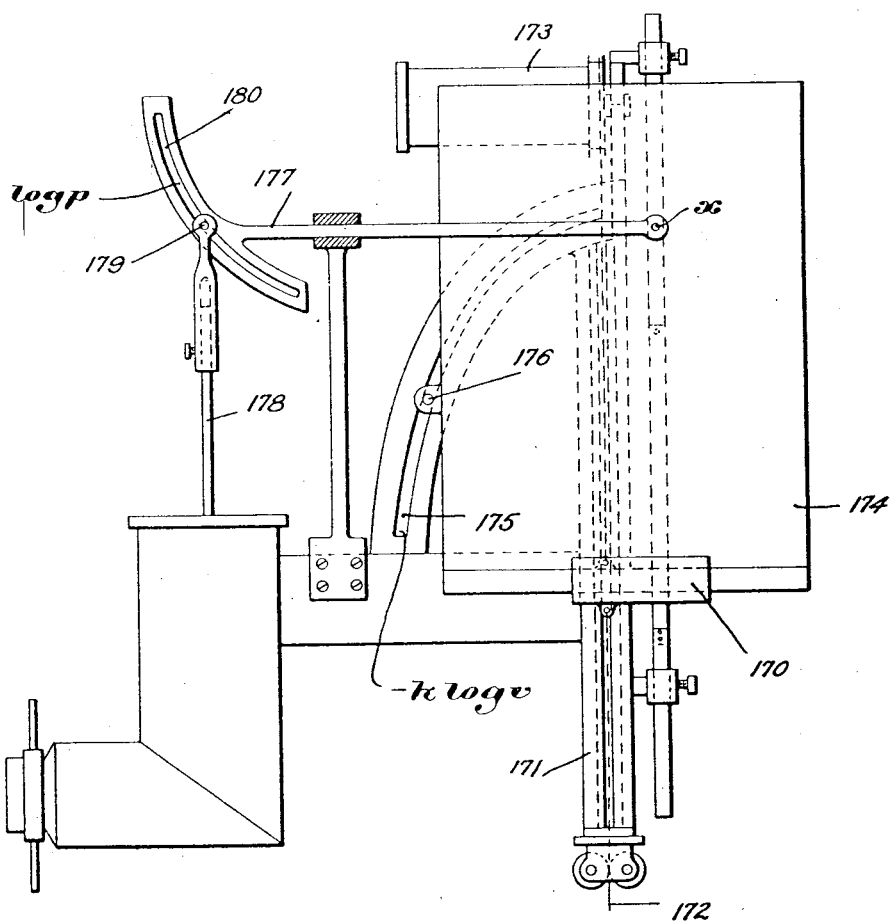

UNITED STATES PATENT OFFICE.

CHARLES W. BERRY, OF WEST SOMERVILLE, MASSACHUSETTS.

RECORDER.

1,093,244. Specification of Letters Patent. Patented Apr. 14, 1914.

Application filed March 5, 1910. Serial No. 547,417.

*To all whom it may concern:*

Be it known that I, CHARLES W. BERRY, a citizen of the United States, and a resident of West Somerville, county of Middlesex, State of Massachusetts, have invented an Improvement in Recorders, of which the following description, in connection with the accompanying drawings, is a specification, like letters on the drawings representing like parts.

This invention relates to methods of and apparatus for producing displacements proportional to the variations of one or more properties of a gas which are derived from motions or displacements proportional to variations in other properties of the gas.

The herein described embodiment of the invention deals with the production of displacements proportional to the variations in the four properties pressure, volume, temperature and entropy of a gas by the utilization of displacements proportional to two of these four as the primary displacements from which the remaining two are produced. In virtue of thermodynamic relations as follows:—

$$pv = RT$$
$$\phi \propto \log. T + (k-1) \log. v + \text{constant}$$
$$\propto \log. T - \frac{(k-1)}{k} \log. p + \text{constant}$$
$$\propto \log. p + k \log. v + \text{constant},$$

it is possible to express any one of the above-named four properties as a function of any two of the remaining three properties. This provides a means for delineating the temperature relations of a gaseous body, referred to its variations in volume, pressure or entropy, or the entropy variations referred to volume or pressure, or other similar relations. This may be accomplished either by a direct recording apparatus or by a projecting or tracing apparatus, the latter adapted to reproduce from one curve, representing certain physical changes, another curve representing other physical changes. For example, from the ordinary indicator card diagram, showing pressure-volume variations of a gas, a curve showing either temperature-volume, temperature-pressure, pressure-entropy, volume-entropy, or temperature-entropy variations may be directly traced, or such a curve in a manner similar to the usual indicator diagram, may be produced directly by a suitable recording apparatus governed by the volume and pressure changes of the gas itself.

Through the use of my invention an indicator card may be secured from a gas engine, or other motor or compressor utilizing a medium which follows approximately the laws of a perfect gas, showing the temperature-pressure, temperature-volume, pressure-entropy, volume-entropy or temperature-entropy variations of the gas during the engine cycle. This affords opportunity for studying the direction and magnitude of the heat interchanges between the gas and the walls of the engine, motor or compressor cylinder and for securing other further information which heretofore has been obtainable only through indirect calculation from the cards of the ordinary pressure-volume indicator.

With the increasing refinement which has taken place in engine design and the use of more highly perfected materials and workmanship, investigation of the cylinder heat losses and heat changes has become of great importance. To show the nature and magnitude of the heat interchanges, temperature-entropy diagrams have heretofore been plotted from the pressure-volume diagram by calculating the temperature and entropy of a sufficiently large number of points to produce a reasonably accurate curve or have been constructed by complicated graphical methods. This, however, requires the expenditure of so much labor and time that the production of such a curve constitutes a mathematical feat rather than a practical aid to engine study and design. Notwithstanding the great value to the designer or engineer of the results obtainable from a temperature-entropy diagram, the labor is so excessive and the principles involved so obscure except to those trained in thermodynamics that the specialist uses such heat diagrams but seldom and the ordinary engineer scarcely at all.

Through my invention temperature-entropy diagrams, and diagrams showing either temperature or entropy variations plotted against either pressure or volume variations, can be produced without calculation and by methods and apparatus as readily available and applicable as those employed in securing the ordinary pressure-volume indicator card. The magnitude and character of the heat changes can thereby be easily ascertained and a betterment of the running conditions of the engine secured by minimizing its heat losses.

The mechanical construction of recording devices having the purposes stated may be widely varied to secure the desired relative movements between the recorder and the recording surface, and my invention is susceptible of embodiment in a great variety of form.

I have hereinafter described for illustrative purposes several forms of the invention from which, in connection with the accompanying drawings, my invention will be best understood, while its scope will be more particularly pointed out in the appended claims.

Figure 9:
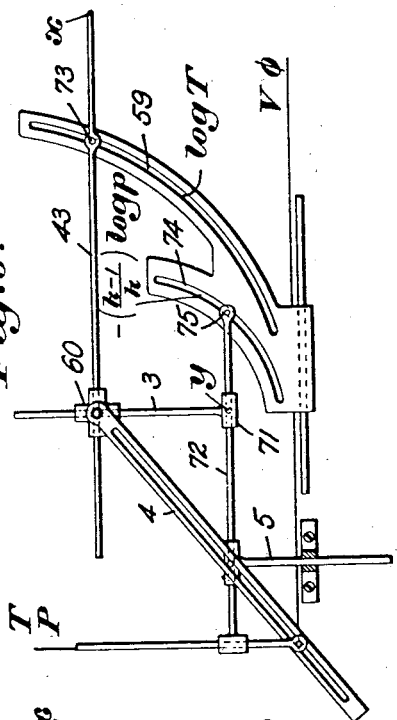
Figure 6:
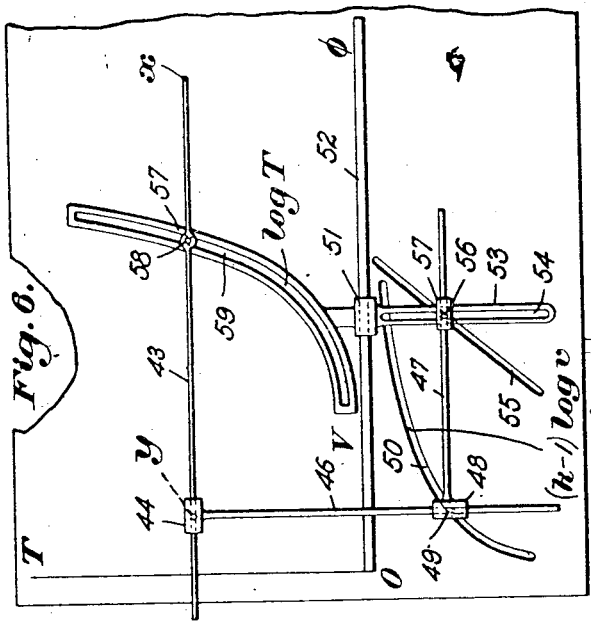
Figure 8:
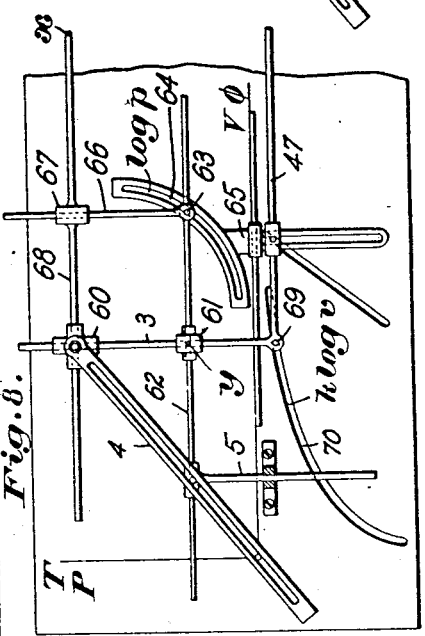

In the drawings: Figure 1 shows a projecting apparatus for delineating the temperature-volume variations of a gas. Fig. 2 shows an indicator for automatically recording temperature volume variations. Fig. 3 is a sectional end elevation partly broken away on the line 3—3 of Fig. 2. Fig. 4 is a projecting apparatus for delineating the temperature-pressure variations of a gas. Fig. 5 is an indicator for automatically recording temperature-pressure variations. Fig. 6 shows a projecting apparatus for delineating temperature-entropy variations from the delineation of temperature-volume variations. Fig. 7 shows a projecting apparatus for delineating temperature-entropy variations from the delineation of pressure-volume variations and embodying the principles of the projecting apparatus shown in Figs. 1 and 6. Fig. 8 shows a similar projecting apparatus slightly modified in form. Fig. 9 shows another modification of the projecting apparatus of Fig. 7. Fig. 10 shows a projecting apparatus for delineating temperature-entropy variations from the delineation of temperature-pressure variations of a gas. Figs. 11, 12 and 13 show modified forms of projecting apparatus for delineating the temperature-entropy variations of a gas from the pressure-volume variations thereof and embodying the principles of the projecting apparatus shown in Figs. 4 and 10. Figs. 14, 15 and 16 show forms of indicators for directly and automatically recording the temperature-entropy variations of a gas and constructed respectively upon the principles of the projectors shown in Figs. 7, 8 and 9. Figs. 17, 18 and 19 show similar indicators constructed according to the principles embodied in the projecting devices of Figs. 11, 13 and 12, respectively. Figs. 21 and 20 show respectively a plan and elevation of a scale adjusting arm for an indicator of the type described. Figs. 22 and 23 are illustrative diagrams. Figs. 24 and 25 show further modifications of an indicating device and projecting apparatus respectively for delineating temperature-entropy variations of a gas. Fig. 26 shows a modified form of indicator wherein relative movement of the recording medium and the marker is obtained partly through optical means; and Fig. 27 shows a form of volume-entropy indicator, which combines the entropy motion as utilized in Fig. 15 with the volume motion instead of the derived temperature motion. Fig. 28 shows a modified form of optical apparatus, utilizing electric measurements of temperature variations and embodying the principles of projecting apparatus shown in Fig. 6.

Referring to Fig. 1, I have there shown the essential features of a projecting or tracing apparatus whereby there may be produced by means of a continuously moving marker from the work or pressure-volume diagram 1 of an ordinary indicator card (here shown as drawn with reference to the rectangular coördinate OP representing pressure, and OV representing volume) a second diagram 2 (drawn with reference to the rectangular coördinates OT representing temperature, and OV, representing volume) showing the corresponding variations in temperature and volume of the same gas. The curve or diagram 1 shows the variations in the conditions of a gaseous body, such as the charge in the cylinder of a gas engine, represented in the pressure-volume or PV plane, and the diagram 2 the conditions of the same gaseous body represented in the temperature-volume or TV plane. Since the principles involved in such apparatus enter into the construction of various modified and amplified apparatus hereinafter described, reference will be made to the factors governing its operation.

From the laws of perfect gases the pressure of a gas equals a constant quantity multiplied by the ratio of the temperature to the volume, this relation being expressed by the equation $$p = R\frac{T}{v}.$$

In other words in the TV plane all points representing the same pressure possess a constant ratio between the temperature and the volume. The representation of temperature-volume variations in a gas having a constant pressure is therefore a straight line passing through the origin O or zero point. Furthermore, if the volume be kept constant pressure variations are proportionate to the temperature variations.

To illustrate with reference to the diagram in Fig. 1, the variations in temperature and volume of the gas having the constant pressure $a$ (see curve 1) will be represented by the straight line O$a$ (see curve 2); that of a gas having the constant pressure $b$ by the line O$b$ and that having the constant pressure $c$ by the line O$c$. Furthermore at any fixed volume $v'$ the gas will possess under the pressure $a$, $b$ and $c$ the corresponding temperature $t'$, $t^2$ and $t^3$, respectively. Having reference still to the diagrams shown in Fig. 1, if a marker $x$ is moved horizontally or parallel with the axis OV in accordance with volume variations represented by the diagram 1, it will delineate such volume variations in the TV plane. But it will also be evident from the above stated relations between the temperature, volume and pressure, that, if the marker $x$ is caused to move vertically (or parallel with the axis OT) proportionally to the product of the pressure and volume represented in the curve 1, the corresponding temperature variations will be delineated in the curve 2, simultaneously with the volume variations. In the embodiment of the invention shown, to secure this result, there is provided a volume-directing arm 3, so connected to the marker $x$ that it is adapted to impart thereto a movement directly proportionate to the volume variations shown by the curve 1. There is further provided a temperature directing arm 4 and a pressure directing arm 5. The former is arranged always to pass through the origin O, and is so connected to the marker $x$, the volume director 3 and the pressure director 5 that it is adapted to impart to the marker a movement at right angles to its volume directed movement and parallel to the axis OT, such movement being compounded of the separate movements of the volume and pressure directors 3 and 5 and proportional to the product of the volume and the pressure variations shown by the curve 1. To this end the temperature directing arm 4 may be provided with an elongated slot 6 by means of which the arm is adapted to slide upon the fixed pin 7 at the origin O and also upon a pin 8, the latter fixedly secured to the vertically movable pressure director 5. The marker $x$ is securely fixed to the temperature director 4, but receives vertical guidance by passing through a longitudinal slot 9 in the volume director 3, so that, as the latter reproduces variations in volume by moving along the volume axis OV, the temperature arm 4 swings about the origin to successively different positions and (disregarding movement of the pressure arm 5) the marker $x$ is raised or lowered as the case may be.

The pressure directing arm 5 is adapted to slide vertically through a fixed guide 10. As the pressure arm 5 is raised or lowered to reproduce pressure variations, the pin 8 sliding in the slot 6 swings the temperature arm 3 about its axis which (disregarding movement of the volume arm 3) raises or lowers the position of the marker $x$. The volume arm 3 is rigidly connected at right angles to a rod 11, the latter slidable through a sleeve 12 carried by the pressure arm so that as a suitable tracing point, which, for example, may be positioned at Y on the volume arm 3, is moved along, the outline of the diagram 1 the volume arm and the pressure arm combine to impart to the marking point $x$ not only the horizontal movement designating variations in volume, but also a compound vertical movement proportioned to the product of pressure and volume and correctly representing in the TV plane corresponding variations in the temperature of the gas.

To utilize the described projector for drawing a temperature-volume curve from the indicator card diagram of a gas engine, for example, the clearance of the engine should be first determined and expressed in per cent. of the piston displacement. From this, together with the atmospheric pressure and the scale of the indicator spring, the zero pressure line, or the axis OP, and the zero volume line, or the axis OV, can be then determined and drawn. The projecting apparatus can then be applied with the pivot point 7 at any convenient point on the pressure axis OP, and the guide 10 fixed preferably between the indicator card and the pressure axis. The pin 8 should then be adjusted to such position on the pressure arm that the distance from the pin 8 to the V axis in the TV plane is equal to the distance from the tracer $y$ to the V axis in the PV plane. By guiding the tracing point $y$ carefully around the card, the marking point will draw the temperature-volume curve. The pin 8 may be adjusted to different positions along the pressure arm to admit of any desired distance between the origins of the PV and TV planes, such adjustment being determined by the size of the diagrams. By fixing the guide 10 at different positions along the axis OV any desired ratio between the temperature and pressure scales may be secured.

It will be obvious that the described device (like the other projecting devices hereinafter described) is reversible and that any delineation of temperature-volume variations may be projected into the PV plane to show corresponding pressure-volume variations by using $x$ as the tracing point and $y$ as the marker. This capacity, for example, may be utilized to draw a series of isothermal lines in the PV plane by guiding the point $x$ along a straight edge placed parallel to the axis OV, whereupon the point $y$, if used as a marker, will draw a rectangular hyperbola expressing the relation $pv = a$ constant.

It will be understood that the apparatus is herein illustrated in semi-diagrammatic form in order that its essential parts may not be obscured by the details of mechanical construction and that its principles of operation may be more clearly depicted. The embodiment of this, as well as other devices hereinafter referred to, in the form of finished and complete mechanical instruments, will be readily understood by those skilled in the art.

By embodying the principles above described in an engine indicator, the temperature-volume curve can be recorded directly and automatically upon the indicator card. This may be accomplished by connecting the pressure directing arm 5 to the indicator piston so that its movement will be directly proportionate to variations in pressure in the engine cylinder, and by connecting the volume director 3 to the piston, cross head, or to its equivalent, so that the latter will move in accordance with variations of volume. In Fig. 2 such an indicator is shown, the same being provided with the usual indicator cylinder 13 containing the piston 14, working against the spring 15. The piston rod 16 constitutes the pressure director and has connection to the temperature directing member or slide rod 17 by means of a pivoted sleeve 18. This connection should be adjustable, as shown, so that at atmospheric pressure the distance between the center of the pivoted sleeve 18 and the horizontal line through the center of pivot 24 can be made equal to atmospheric pressure expressed in terms of the scale of the indicator spring 15. The temperature director 17 is pivotally secured to the marker-carrying block 19 the latter being slidable in a vertical slot formed in the volume director 20.

The volume directing arm 20 is mounted upon the carrier 21, adapted to have a sliding movement on the guide rods 22 (see Fig. 3). The carrier 21 is attached by the cord 23 through any usual reducing mechanism (not shown) to the engine cross head, so that the marker is given a horizontal movement proportionate to variation in volume of the cylinder charge. The opposite end of the directing arm 17 passes through a second sleeve 24, pivotally secured to the fixed post 25 so that there is fixed a pivotal point corresponding to the origin O in Fig. 1. The carrier 21 also sustains the rotatable indicator drum 26 of any usual construction. The drum has wound thereon the cord 27, the opposite end being secured to any fixed point, such as the post 25, so that, as the carrier is moved back and forth on the guide rods, the drum, with the card secured thereto, is not only carried along with the carrier but is also turned beneath the marker, presenting thereto successive portions of the card surface. The indicator card therefore has the same relation relatively to the marker as in the case of the projecting apparatus shown in Fig. 1. The usual spring within the indicator drum serves as a return spring tending to wind up the drum so that on the return movement of the engine piston the carrier and the volume arm are moved reversely. It will be evident that a relative movement of the kind described is all that is necessary between the card and the marker and that the latter might be stationary and the card movable, or the card might be a fixed plane surface and all movement performed by the marker, or any other desired arrangement of the working parts had to secure the object stated.

In the ordinary pressure-volume indicator the line of zero volume can be estimated from the clearance and applied to the card after the latter has been taken. In the described indicator, however, the pivotal axis of the sleeve 24 should occupy a definite relation to the line of zero volume, so that the indicator should be initially adjusted to preserve the desired relation in this respect. To this end adjustment is provided on the described form of indicator so that the distance of the volume director from the origin at the beginning of a stroke shall have the same relation to the length of the stroke as has the clearance space of the engine or compressor to its piston displacement. Herein an adjustable scale 28 is secured to the indicator parallel with the movement of the volume director, such scale having marked thereon between graduation O and 100 a selected arbitrary length of stroke for the volume director. The reducing mechanism is then adjusted so that the movement of the volume director will be equal the selected stroke length. At the left of the zero mark on the scale there are provided graduations expressing percentage of the selected stroke length. If the clearance of the engine, for example, is 32% of the piston displacement, the graduation representing 32% will be positioned beneath the pointer 29 which is attached vertically below the center of the pivoted sleeve 24 and represents the point of zero volume. The scale is slidably mounted on brackets 30 provided with clamping screws so that it can be adjusted as required. Following this, the cord 23 is then so adjusted that, at the beginning of the piston stroke, the pointer 31 on the carrier 21 stands at the zero mark. This provides such a condition that the conditions of the diagram in Fig. 1 are reproduced and the distance of the volume director to the origin is always proportionate to the true volume.

The same general principles as are employed in the above described apparatus for delineating the temperature-volume variations of the gas may be utilized for drawing the temperature-pressure variations of a gas. In Figs. 4 and 5 I have shown devices for projecting and automatically recording respectively the changing conditions of a gas with reference to pressure and temperature variations instead of with reference to volume and temperature variations as in the apparatus of Figs. 1 and 2.

Referring to Fig. 4, the tracing point $y$, which is adapted to follow a curve drawn with reference to the axes OV and OP, is carried by the pressure director 33 and also has attachment to the volume director 34 by means of the rigidly connected rod 35 and the sleeve 36. The same connections are herein afforded between the tracing point $y$ and the marker $x$ as in the case of the apparatus shown in Fig. 1, except that the connections are reversed with reference to the pressure and volume directors so that the marker $x$ is moved parallel to the axis OP in direct proportion to the movement of the pressure director and parallel to the axis OT in proportion to the product of the movement of the volume and pressure directors. The marker, therefore, will trace with reference to the axes OP and OT a curve of varying temperature and pressure if the tracing point $y$ is caused to follow a curve of varying pressure and volume.

In Fig. 5 is shown an automatically recording indicator constructed upon the principles of the projector shown in Fig. 4, so that the marker $x$ moves vertically in direct proportion to the varying pressure of the cylinder charge, while it moves horizontally in proportion to the product of the pressure-caused movement and the volume-caused movement. The construction of this indicator will be readily apparent from the drawings in connection with the description of the previous apparatus. In the indicator of Fig. 5 the recording surface 37, instead of being carried by a rotatable drum, is fixed, and the marker moves over the plane surface of a recording sheet thereon. The volume-director 38 is mounted to slide upon a guide rod 39, being moved in one direction by the cord 40 connected to a reducing mechanism, and in the opposite direction by the cord 41 connected to a barrel 42 containing a suitable return spring. The curve traced upon the indicator card 37 will represent changes in pressure referred to changes in temperature of the gas in the engine cylinder. The initial adjustment of the parts may be carried out in substantially the same fashion and by the same means as those shown in connection with the indicator of Fig. 2.

Referring now to Fig. 6, I have there shown an apparatus whereby from a temperature-volume curve such as may be produced either by the projector shown in Fig. 1 or the indicator shown in Fig. 2, there may be drawn, by a continuously moving marker, the curve representing the corresponding temperature-entropy variations of the gas.

The entropy of a perfect gas (which may be expressed for convenience by $\phi$) may be expressed in terms of the temperature and volume thus:

(1) $\phi \propto \log. T + (k-1) \log. v + \text{constant}$ or it may be expressed in terms of the temperature and pressure.

(2) $\phi \propto \log. T - \dfrac{k-1}{k} \log. p + \text{constant}$ or in terms of the pressure and volume, thus:

(3) $\phi \propto \log. p + k \log. v + \text{constant}$ $k$ being a constant quantity dependent on the particular gas under consideration, and equal to the specific heat at constant pressure divided by the specific heat at constant volume, i. e.

$$k = \frac{C_p}{C_v}.$$

In Fig. 6 I have there shown an apparatus where the marker $x$ is caused to move horizontally, or parallel to the entropy axis O$\phi$, proportional to the value of entropy represented by the first equation given above. That is to say, to the marker there is not only imparted a movement parallel to the axis OT proportionate to temperature changes, but also a movement parallel to the axis O$\phi$ which is proportionate to the logarithm of the temperature variations plus $(k-1)$ times the logarithm of the volume variations. The latter movement, therefore, correctly reproduces the entropy variations of the gas. To this end the marker $x$ is mounted on an arm 43 which is adapted to slide horizontally through the sleeve 44, carrying the tracing point $y$. The sleeve 44 is fixedly secured to the temperature director 46. The latter moves vertically to follow variations of temperature represented by the temperature-volume curve and imparts a like vertical movement directly to the marker $x$. As the tracing point $y$ is moved horizontally it imparts a like movement to the volume director 47 by means of the sleeve connection 48 between the latter and the temperature director 46. The movement of the volume director, however, is transmitted to the marker $x$ through the interposition of a logarithmic director so that the horizontal displacement of the marker due to the displacement of the volume director is equal to log. $v$. At the same time the vertical displacement of the temperature director imparts to the marker a horizontal displacement equal to log. T which is added to the volume-caused movement of the marker. To this end the sleeve 48 carries a pin 49 which herein receives guidance from a directing slot 50 formed in some fixed part of the apparatus, so that, as the volume director moves laterally, it is also caused to move vertically in conformance to the shape of the slot. The slot herein constitutes the logarithmic director referred to, being shaped with reference to the axis OV in conformity to the expression $(k-1)$ log. $v$. That is to say, as the volume director moves laterally to represent change from one volume to another, it will also be moved vertically from a position representing $(k-1)$ times the logarithm of the first volume to a position representing $(k-1)$ times the logarithm of the second volume. To transmit the movement of the volume director 47 to the marker the former is caused to move the sliding carrier 51 along the guide rod 52, the carrier having a depending arm 53 provided with a slot 54. The vertical movement of the volume director 47, however, as restricted by the guiding slot 50, is first converted into a horizontal movement of the carrier 51 by the following means: Working within the slot 54 on the carrier arm 53, and also within a fixed slot 55 arranged at an angle of 45° to the axis OV, is a guiding pin 56 carried by a sleeve 57 through which the volume director has a horizontal sliding movement. As the volume director 47 moves vertically, the sleeve moves vertically, but also moves horizontally by an equal amount due to the guidance of the slot 55. Horizontal displacement of the sleeve 57 is communicated by the pin 56 to the carrier 51, so that the latter receives a horizontal displacement equal to $(k-1)$ log. $v$. The carrier 51 is provided with an arm 57 having connection to the marker carrying arm 43, so that the latter also receives a displacement equal to $(k-1)$ log. $v$. To communicate an additional horizontal displacement to the marker equal to log. $T$, the connection between the marker carrier and the carrier is provided in the form of a pin 58 fixedly secured to the arm 43 but working in a slot 59, the latter so shaped with reference to the temperature axis that it follows log. $T$ and guides the pin and marker carrier 43 horizontally in accordance with log. $T$. That is to say, the slot conforms to a logarithmic curve such that each vertical movement of the temperature director is accompanied by a horizontal movement of the arm 43 which displaces it by an amount (disregarding its volume-caused movement) equal to log. $T$. It will therefore be seen that, as the tracing point $y$ is caused to follow the outline of any temperature-volume curve, the marker $x$ will move vertically according to temperature variations, and horizontally according to the logarithm of the temperature plus $(k-1)$ times the logarithm of the volume, or, in other words, according to changes in entropy.

It will be evident that the apparatus shown in Fig. 6 may be reversely used to draw the temperature-volume curve from the temperature-entropy curve by placing the tracing point at $x$ and the marker at $y$; also that the marker at $y$ may be made to draw a series of adiabatic curves in the $TV$ plane by guiding the tracer at $x$ along a straight edge placed parallel with the axis $O\phi$. It will also be evident that the requisite relative movement between the marker and the recording surface may be obtained by combinations of movements other than the precise ones shown in Fig. 6. For example, the marking point $x$ may be given vertical or temperature displacement, only, and the recording surface the horizontal or entropy displacement; or the marker may have the horizontal displacement log. $T$ and the recording surface the displacement $(k-1)$ log. $v$; or the marker the horizontal displacement $(k-1)$ log. $v$ and the recording surface log. $T$. These minor variations in form are all within the spirit of my invention and will be understood as to the devices hereinafter described without necessity of further mention. The combination of the principles under which the projecting apparatus shown in Fig. 6 and that shown in Fig. 1 are constructed may be usefully employed to project a pressure-volume curve such as is contained on an ordinary indicator card from the pressure-volume plane into the temperature-entropy plane.

In Fig. 7 I have shown an apparatus wherein the marker $x$ will draw the temperature-entropy curve with relation to the axis $OT$ and $O\phi$ if the tracing point $y$ is caused to follow the outline of the pressure-volume curve located with reference to the axes $OP$ and $OV$, the various parts of the apparatus being designated by the same numerals as the corresponding parts in the devices of Figs. 1 and 6. In this case the pressure director 5 is connected to a temperature arm 4 and volume director 3—47 in substantially the same manner as is the case of the projecting apparatus in Fig. 1, so that the traveling sleeve member or temperature follower 60 is caused to move vertically in accordance with temperature variations and horizontally in accordance with volume variations. The temperature variation movement of the follower 60 is then communicated to the marker $x$ by connections which are substantially the same as those shown in Fig. 6. The movement of the volume director 3—47 is also communicated to the marker $x$ by connections which are substantially the same as those in the apparatus of Fig. 6, so that starting with the movement of the tracing point $y$ following variations in pressure and volume, the marker $x$ is caused to follow and delineate variations in temperature and entropy.

In accordance with the third expression for entropy, the latter may be regarded as varying in accordance with the logarithm of the pressure plus $k$ times the logarithm of the volume. The same result, therefore, may be obtained as in the apparatus of Fig. 7 by imparting to the marker $x$ a horizontal displacement proportional to the logarithm of the vertical displacement of the pressure director 5 and adding to that a further horizontal displacement equivalent to $k$ times the logarithm of the horizontal displacement of the volume director 3—47. This is accomplished by causing the vertical or pressure movement of the tracer $y$ to be transmitted through the double sleeve 61, and the sliding arm 62 carried thereby, to the pin 63, the latter carried by the said arm and working in a slot 64 presented by the movable carrier 65. The slot 64 is shaped to conform to log. $p$ so that vertical movements of the tracer $y$ are converted into horizontal movements equivalent to log. $p$ and these are transmitted to the upright arm 66 secured to the sliding arm 62 at any convenient point as the pin 63 and vertically slidable through the sleeve 67 on the marker arm 68.

An additional horizontal movement is communicated to the marker arm and marker equal to $k$ log. $v$ through the horizontal movement of the carrier 65. To produce this movement the volume director 3 is provided with a pin 69 constrained to move in the slot 70, the latter shaped in accordance with the variations of $k$ log. $v$. The vertical movement of the pin 69 in the slot 70 is communicated to the carrier as a horizontal movement by connections which are substantially the same as those shown in Fig. 7. The movement of the marker $x$ therefore in a horizontal direction records variations in entropy just as in the apparatus of Fig. 7, although utilizing different movements of the intermediate linkages.

Similar projections of the temperature-entropy variations of a gas may be secured by means of movements conforming to the second expression for entropy, that is $$\phi \propto \log. T - \frac{(k-1)}{k} \log. p + \text{constant}$$

and such apparatus is shown in Fig. 9. Here the tracer $y$ is secured to the sleeve 71 rigidly carried by the volume arm 3, but having horizontal sliding movement on the arm 72 which latter arm, however, causes the movement of the pressure-director 5. The marker carrying arm 43, moving vertically as it does, through connections similar to those in Fig. 1 and in the apparatus also of Figs. 7 and 8, carries a pin 73 which works in a slot 59 shaped to conform to log. T, so that the arm 43 and with it the marker $x$, have a horizontal movement equal to log. T. The carrier is also provided with directing means, such as the slot 74, which receives a pin 75 on the arm 72 and partakes of the vertical pressure-caused movement of the tracer $y$. This slot is shaped to conform to the expression $$\frac{(k-1)}{k} \log. p$$

so that the carrier and the marker have an additional movement equal to $$-\frac{(k-1)}{k} \log. p,$$

or, in other words, a total movement corresponding to the entropy variations as expressed in terms of the pressure and temperature.

It will be seen that in each of the three projecting devices shown in Figs. 7, 8 and 9, like that shown in Fig. 1, there is provided a temperature follower 60 which is directed to move in accordance to variations of pressure and volume, and that such motion is communicated to an appropriate marker. It will also be seen that the marker has communicated to it a movement at right angles to its first-mentioned movement, which is compounded of the movements of the temperature follower and volume director in one case, the pressure director and volume director in another case, and the temperature follower and temperature director in a third case, the movements in each instance, however, being appropriately converted, by suitable logarithmic directors, to impart a resultant movement to the follower proportionate to entropy variations of the gas.

It will be evident that in any of the projectors described a marker might be carried by the temperature follower and caused to trace the temperature-volume curve simultaneously with the tracing of the temperature-entropy curve by the marker $x$.

As in the case of the projectors previously described the projectors illustrated in Figs. 7, 8 and 9 may be used reversely and adiabatic curves may be drawn in either the TV or PV planes by placing the marker at 60 or at $y$, then adjusting it upon any point through which an adiabatic curve is to be drawn and then constructing the curve by guiding the point $x$ along a straight edge parallel to the axis O$\phi$.

In Fig. 10 I have shown a projecting apparatus similar to that shown in Fig. 6, but serving to project the temperature-pressure variations of a gas into the temperature-entropy plane. The tracing point $y$ is carried by the arm 76 which is caused to transform the horizontal pressure-caused displacement into an entropy displacement of the marker $x$. The arm passes through a sleeve 77 carrying a pin 78 guided by the slot 79, which transforms the horizontal displacement of the arm 76 into a vertical displacement of the pin 78 and arm 79 carrying the pin proportionate to $$-\frac{(k-1)}{k} \log. p.$$

This is communicated to the carrier 80 as to horizontal movement by means similar to those heretofore described. To this horizontal displacement of the carrier is added a horizontal displacement due to the pin 81 carried by the marker 82 and working in a slot 83 presented by the carrier and shaped to conform to log T. The projecting apparatus of Fig. 10 can be combined with the apparatus of Fig. 4 for projecting pressure-volume variations into temperature-entropy variations. Three forms of such devices are shown in Figs. 11, 12 and 13, these being constructed according to the three different expressions of entropy previously given. These devices shown in Figs. 11, 12 and 13, differ from the temperature-entropy projectors shown in Figs. 7, 8, and 9 in that the temperature follower 60, as in the apparatus of Fig. 4, moves in accordance with temperature-pressure variations instead of temperature-volume variations.

In Fig. 11 the marker is displaced parallel with the entropy axis in accordance with the logarithm of the pressure plus $k$ times the logarithm of the volume. The construction of the linkages and connections which convert the movement of the pressure and volume directors into an entropy movement will be apparent from the drawings in connection with the description which has already been given.

In Fig. 12 the horizontal movement of the marker is secured by imparting thereto a displacement equal to $$-\frac{(k-1)}{k}$$

times the logarithm of the pressure displacement and a second displacement in the opposite direction equivalent to the logarithm of the temperature displacement.

In Fig. 13 the marker $x$ is displaced parallel to the entropy axis by an amount equal to the logarithm of the temperature plus $(k-1)$ times the logarithm of the volume.

As in the case of the temperature-volume projector and indicator the temperature-entropy projectors shown in Figs. 7, 8 and 9 present a readily available means, for constructing indicators adapted to record automatically the temperature-entropy variations of the gaseous charge in the engine cylinder.

Referring to Fig. 14, the volume director 84 is moved laterally by a suitable connection 85 to the engine piston, the connection also extending to the block 86 sliding in the vertical fixed guideway 87. From the block 86 the connection extends to a suitable return device consisting of a spring contained within the barrel 88. Variations in volume in the engine cylinder are accompanied by a horizontal movement of the director 84 and a vertical movement of the block 86. The block carries a pin 88ˣ sliding in the logarithmic slot 89, the latter being presented by a carrier 90, slidable horizontally in fixed guides 91. The opposite end of the carrier also presents a logarithmic directing slot 92, which guides the pin 93 secured to the marker arm, so that as the temperature following sleeve 94 is raised or lowered with the variations of temperature (similarly to the movement of the block 19 in Fig. 2) the marker and its arm are also moved horizontally in accordance with variations in entropy as given by the expression $$\log. T + (k-1) \log. v.$$

The holder 95 with the indicator card is herein held fixed, the marker being caused to traverse its plane surface.

It will be noticed that an instrument like that shown in Fig. 14 for delineating the temperature and entropy variations is compounded of several primary following members which themselves execute movements proportional to all four properties of the gas. It is possible, therefore, by applying markers to the different following members on the indicator of Fig. 14 to secure any desired curve. For example, there may be produced, if desired, simultaneously, and upon the same record sheet, with the curve of temperature-entropy variations, also curves representing the pressure-entropy variations, volume-entropy variations, temperature-volume variations, temperature-pressure, and even the pressure-volume variations. Temperature-volume variations may be recorded by a marker located at $x'$. Volume-entropy variations may be recorded by a marker located at $x^2$ on the double sleeve represented by dotted lines and guided on rods or members rigidly secured to the pins 93 and 88ˣ respectively, such rods being diagrammatically represented by dotted lines to avoid confusion in the drawing. The pressure-entropy variations may be recorded by a marker located at $x^3$ and carried by the double sleeve shown in dotted lines, such sleeve being guided on rigid rods or members connected to the pin 93 and the indicator piston rod, respectively.

In Fig. 15 there is shown an indicator wherein the movement of the marker parallel with the entropy axis is caused by logarithmic pressure and logarithmic volume caused movements. The pressure movement is converted into an entropy movement for the marker $x$ by means of the sliding carrier 96 which, through the guide slot 97, controls the horizontal movement of the marker. The carrier 96 presents the directing slot 98 to a pin 99 carried by the arm 100, the latter attached to the piston of the indicator. The directing slot 98 being shaped according to log. $p$, the horizontal movement of the carrier is proportionate to log. $p$. In this indicator the required relative movement between the marker and the record sheet is affected by also moving the card holder 101 proportionately to log. $v$, and in a direction opposite to the required movement of the marker or equivalent to −log. $v$. For this purpose the holder 101 carries an extension 102 which presents the guiding slot 103 in which works the pin 104 carried by a block movable vertically with the horizontal movement of the volume director. This secures a relative movement between the marker and the recording sheet which is equal to the entropy variations expressed by $$\log. p + k \log. v.$$

The third variety of projector shown in Fig. 9 can also be embodied in the form of an indicator, such embodiment being shown in Fig. 16. Herein the vertical movement of the temperature following block 105 is transformed into a horizontal movement of the marker by means of the pin 106 on the sliding arm 107 which pin engages a directing slot (log. T) on the carrier 108. The carrier also presents a slot shaped according to $$-\frac{(k-1)}{k} \log. p$$

which receives a pin 109 carried by the piston stem 110, so that the piston movement is also transformed into a horizontal movement of the marker, the two movements effecting a displacement equal to or proportional to the entropy change.

In Figs. 17, 18 and 19 there are shown indicators developed from the projecting apparatus shown respectively in Figs. 11, 13 and 12. In Fig. 17 the temperature responsive member 111 is moved vertically under the direction of a horizontally moved pressure arm 112 and a vertically moved volume director 113, the latter comprising a block slidably mounted in the guideway 114 and connected to the cross head or piston by the connector 115. Appropriate horizontal movement is given the marker $x$ to conform to entropy variations by a combined movement of the carrier 116 and the card holder 117. The former is provided with a vertical slot 118 which guides the marker carrying block 119, movement being imparted thereto proportional to log. $p$ through mechanism which is similar to that previously described and is controlled by the piston actuated pin 120 working in the director slot 121. On the other hand, a movement in the opposite direction, proportionate to $k$ log. $v$, is given to the card holder 117 by means of the pin 122 carried by the block 113, and working in the slot 123, the latter presented by an extension of the holder 117.

In Fig. 18 is shown a modified form of indicator quite similar to that shown in Fig. 17, the relative movement between the marker $x$ and the holder 117 being secured through the guidance of the marker-carrying sleeve 124 in the slot 125 (log. T) and through the further guidance of the holder 117 by means of the slot 126 shaped to conform to $$(k-1) \log. v.$$

The vertical movement of the temperature follower 111 moves the sleeve 124 vertically and therefore laterally through the guidance of the slot 125. Vertical movement of the volume responsive member 113 and the connected pin 122 moves the holder laterally under the direction of the slot 126. The relative displacement between the marker and the card is therefore proportional to the entropy variations.

Referring to Fig. 19, the temperature follower is moved laterally directly from the pressure actuated piston rod 127, its vertical movement being proportionate to temperature variations. Its vertical or temperature responsive movement is communicated to the marker $x$ which, through its engagement with the logarithmic slot 128 (log. T) moves the marker-carrying arm 129 and the marker horizontally to produce a displacement in proportion to the logarithm of the temperature. At the same time, through connections similar to those previously described, the carrier 130, which supports the arm in which is formed the slot 128, is moved in the opposite direction by means of the engagement of the pin 131 in the slot 132, the said pin being moved in response to the pressure-actuated movement of the stem 127. The slot 132 being shaped to conform to the expression $$-\frac{k-1}{k} \log. p$$

the resultant horizontal movement of the marker over the face of the fixed card holder 133 is proportionate to variations in entropy.

In Figs. 20 and 21 I have shown an attachment for readily varying the stroke or movement of the volume director so as to bring it into agreement with the scale 28 described in connection with Fig. 2. It may happen that, through wear in the brasses, or for other reasons, the actual engine stroke varies somewhat from the designed stroke. Under such circumstances, if the volume director starts at the scale mark O on the scale in Fig. 2, it will then overrun or fall short of the scale mark 100 by a small amount. To avoid this there may be attached to the indicator an adjusting arm 134 pivoted at 135. This arm has a carrier 136 slidably mounted thereon and moved by the cross head attachment 137. Motion is transmitted from the carrier 136 to the volume director by means of a block 138 pivoted on the carrier and slidable laterally in the slotted member 139, the latter projecting from the volume director. The apparent stroke, as measured by the movement of the carrier 136 on the arm 134, is thereby converted into the more or less reduced movement of the volume director according to the angular position of the arm. The latter is adjustable upon the segment 140 to which it may be secured in any desired position by a clamping screw 141. By this means the relation of the volume director to the other fixed parts of the indicator can always be kept what it should be.

In the projectors and indicators previously described the marker is caused to follow in one direction the movement of a temperature follower, which latter has a movement compounded of the movements of the pressure and volume directors. It is possible, however, to convert the movements of the pressure and volume directors directly into a temperature-entropy movement of the marker without the interposition of the temperature-follower. The construction of the apparatus will be understood from the following considerations.

If there are represented both in the pressure-volume plane and the temperature-entropy plane a constant pressure and a constant volume curve, any condition defined by the intersection $a$ (see Figs. 22 and 23) of a given constant pressure curve and a given constant volume curve in the pressure-volume plane will be located at the intersection $a'$ of the same two curves in the temperature-entropy plane.

A constant volume curve in the latter plane is a logarithmic curve following the expression $C_v$ log. $_eT$ where $C_v$ represents the specific heat at constant volume. The constant pressure curve in the same plane is also a logarithmic curve which follows the expression $$C_p \log. T = kC_v \log. _eT.$$

All constant pressure curves and all constant volume curves are of the same contour so that if two slots, so shaped as to represent respectively a constant pressure curve and a constant volume curve in the temperature-entropy plane, are moved parallel to the entropy axis they may be made to assume successively the positions of all constant pressure and constant volume curves. If the constant pressure slot can be moved along the entropy axis to correspond to movements of the pressure director along the pressure axis, and if the constant volume slot can be moved along the entropy axis to correspond to the movements of the volume director along the volume axis, then the intersection of the constant pressure and constant volume slots will correctly represent the condition of temperature and entropy in the temperature-entropy plane for any given position of the volume and pressure directors.

From the thermodynamic expressions for entropy $\phi = C_v$ log. $T + (C_p - C_v)$ log. $v +$ constant or $= C_v$ log. $T + (k-1) C_v$ log. $V +$ constant and $\phi = C_p$ log. $T - (C_p - C_v)$ log. $p +$ constant or $= K. C_v$ log. $T - (k-1) C_v$ log. $p +$ constant on dividing by $C_v$ we obtain $\phi \propto$ log. $T + (k-1)$ log. $v +$ constant
$\phi \propto K$ log. $T - (k-1)$ log. $p +$ constant.

Therefore at constant temperature if the volume director in the $pv$-plane moves from position $v_1$ to position $v_2$ the volume director must move parallel to the entropy axis from position $(k-1)$ log. $v_1$ to $(k-1)$ log. $v_2$; that is, while the position of the volume director with reference to the volume scale in the $pv$-plane is always proportional to the volume of the gas the position of the volume director with reference to the location of the unit volume line on the entropy scale in the $T\phi$-plane is always proportional to $(k-1)$ times the logarithm of the volume of the gas, and similarly while the position of the pressure director relatively to the pressure scale in the $pv$-plane is proportional to the pressure of the gas the position of the pressure director relatively to the location of the unit pressure line on entropy scale is always proportional to $-(k-1)$ times the logarithm of the pressure of the gas.

The proposed movement of the constant pressure and constant volume slots along the entropy axis being along an isothermal line, it only remains to impart a movement to the constant volume slot proportional to the expression $(k-1)$ log. $v$ and to the constant pressure slot a movement proportional to the expression $-(k-1)$ log. $p$.

In Fig. 25, there is shown a projecting apparatus based upon these principles. The marker $x$ is guided by two slots 142 and 143. The former represents the constant volume curve and the latter the constant pressure curve. For the former any arbitrary logarithmic curve may be selected, the constant pressure curve being then constructed with its abscissæ

$$\frac{C_p}{C_v} = k$$

times those of the first curve. The constant volume slot is subject to a displacement horizontally through the horizontal movement of the tracing point $y$ transmitted through the volume director 145, such displacement, however, being modified by the directing slot 146. The latter is shaped to follow a logarithmic curve constructed with the logarithmic component $(k-1)$ log. $v$ so that the slide rod $146^x$ and the slot carrier 147 attached thereto are moved horizontally to give the constant volume slot 142 its proper position in the entropy plane under varying conditions of volume. In the same manner the directing slot 148, which is shaped to conform to the expression $$-(k-1) \log. p$$

provides that the proper position of the constant pressure slot 143 will be had under all conditions of pressure. That is to say, any vertical movement of the tracing point from pressure $p_1$ to pressure $p_2$ produces a horizontal displacement of the pressure slot 143 by an amount proportional to $$-(k-1) \log. \frac{p_2}{p_1},$$

and any horizontal displacement of the tracing point from volume $v_1$ to volume $v_2$ produces a displacement of the volume slot by an amount proportional to $$(k-1) \log. \frac{v_2}{v_1}.$$

The same constructive principles may be utilized to produce a temperature-entropy indicator and such instrument is shown in Fig. 24. The construction of such indicator will be apparent from the description of the projector shown in Fig. 25. The vertically movable volume director 149 causes the horizontal displacement of the constant-volume slot-carrier 150 by means of the pin 151 working in the logarithmic slot 152. Similarly, the pressure director 153 causes the horizontal displacement of the constant pressure slot carrier 154 by means of the pin 155 working in the logarithmic slot 156.

It will thus be seen that the tracing point $x$ in the indicator of Fig. 24 will reproduce the temperature-entropy variations of the gas directly upon the recording sheet without the intervention of any temperature follower, as in the indicators previously described.

It is not necessary to resort to mechanical connections between the moving parts to secure the required relative movement between the marker and the recording surface. Other means, such as optical recorders, may be employed and, in some cases, may be preferable.

In Fig. 26, I have shown an optical temperature-entropy indicator based upon the principles underlying the mechanical indicator illustrated in Fig. 14, but securing relative movement between a recording surface, herein a sensitive photographic plate 157, and a recording medium, herein a ray or pencil of light directed by a suitable apertured screen.

Referring to Fig. 26 the indicator piston rod is connected to a rock lever 158 and thereby to the rock shaft 159 and reciprocatory screen 160. The latter is mounted to rock about an axis at a point corresponding to the origin O in Fig. 1, there being also located in substantial coincidence with its axis a source of light such as the electric or other lamp 161 adapted to shed its light upon the back of the screen 160. The latter is provided with a slit 162 parallel with the axis of the screen, the walls of the screen being carried out at 163 either side of the slit so as to shut off from the opposite side of the screen all but a thin sheet of light, the latter being caused to assume an angular position dependent on the angular position of the bounding walls 163 of the slit. Facing the screen 160 there is provided a second screen 164 so arranged as to receive the sheet of light passing through the screen 160. As the latter is rocked about its axis the screen 164 will be traversed vertically by a narrow band or line of light, the vertical position of this line being dependent on the angular displacement of the screen 160 and the distance of the screen 164 from the same axis. The screen 164 is carried by the sliding carrier 165, the latter having any suitable connection 166 to the cross-head or piston so that its distance from the source of light is dependent on the volume of the gas in the cylinder of the engine or compressor. It will be seen that this arrangement provides conditions substantially similar to those in the indicator of Figs. 1 and 14, that is to say, the vertical position of the line of light which is cast upon the screen 164, like that of the marker $x$ in Figs. 1 and 14, is dependent at any given time on the temperature of the gas in the cylinder at that time.

To record the entropy and temperature changes upon the sensitive plate 157, the screen 164 which overlies the plate is provided with a slot 167 so that the light passing through the screen and against the plate is in the form of a ray or fine pencil of light having a position at any given time dependent jointly on the vertical position of the line or band of light and the shape of slot 167. The vertical position of the recording ray, as will be seen from the foregoing description, varies with the temperature. The horizontal position of such ray is caused to vary with the entropy of the gas by shaping the slot 167 to conform to log. T and causing a displacement of the plate proportional to $-(k-1)$ log. $v$ so that the relative movement horizontally between the record ray and the plate is proportional to log. T $+ (k-1)$ log. $v$.

To cause the horizontal displacement of the plate holder proportional to $-(k-1)$ log. V, the holder is mounted in the carrier 165 so as to have a transverse sliding movement therein. This may be accomplished in any desired way, but herein the holder is provided with a depending pin 168 working in the logarithmic slot 169, the latter so shaped that as the carrier is reciprocated on its guide ways, the displacement of the holder in its carrier is always proportional to $-(k-1)$ log. $v$.

It will, of course, be understood that in the practical embodiment of the apparatus depicted in Fig. 26 the latter will have adequate and suitable provision for protecting the screen and the plate from the effect of all external light as well as from all light emitted from the source 161 except that which passes through the slit 162 and the slot 167.

The optical principle obviously may be applied to any of the other forms of indicators hereinbefore referred to as well as to numerous other forms which it is possible to construct under the principles of this invention. The embodiment of the indicator in the optical form may sometimes lead to a great simplification in the mechanical construction. For example, in the case of the indicator shown in Fig. 24, the constant volume curve and constant pressure curve may be provided each in the form of a slit in the face of an opaque screen and the one screen superimposed on the other. By then imparting to the two screens the movements given the two slots respectively shown in the indicator of Fig. 24, light thrown upon the face of the exterior screen will pass through to the recording surface in the form of a ray or pencil and will trace the temperature-entropy curve on the face of the underlying sensitized plate.

The application of the described principles to indicators or projectors for delineating pressure-entropy or volume-entropy curves will be evident from the foregoing considerations. The construction and operation of any of the numerous forms of such instruments will be evident from the illustrative example shown in Fig. 27, wherein there is shown one form of volume-entropy indicator. Referring to Fig. 27, the recording sheet is supported in any suitable carrier herein represented by the movable block 170 adapted to slide vertically on the guide rod 171 under the control of the cross head connector 172 and a suitable return spring in the barrel 173. As the carrier is reciprocated vertically the holder 174 for the recording sheet is moved horizontally under the control of the logarithmic directing slot 175, which is shaped in conformance with the expression $-k$ times log. V, the holder being provided with a suitable pin 176 engaging the walls of the slot. The marker $x$ is carried by the arm 177 and is given also a horizontal movement under the control of the pressure director 178, which latter is provided with a pin 179 working in the directing slot 180, connected to the marker carrying arm 177. The slot 180 being shaped to conform to log. P, the relative horizontal movement between the marker and the holder 174 is equal to log. P plus $(k)$ log. V, and is, therefore, proportional to the variations of entropy. The device of Fig. 27 it will be seen, is but a modification of Fig. 15 in that the temperature movement of the marker has been replaced by a volume movement of the recording surface.

The motion of the piston is controlled by the strength of the indicator spring so that the vertical scale of the log. $p$ slot must vary accordingly. Each instrument is therefore preferably supplied with corresponding sets of indicator springs and log. $p$ slots.

In Figs. 15 to 19, inclusive, and Figs. and 27 where a log. $p$ displacement is derived from the piston displacement, the relative positions of the point guided by the piston and of the directing slot should be so adjusted as to obtain the logarithmic displacement corresponding to the given pressure. This can be accomplished by indicating the point on the logarithmic slot corresponding to atmospheric pressure and then adjusting the pin on the piston rod to this point by varying the length of the rod through suitable adjustments as indicated in the drawings. In the case of Figs. 15, 16, 17, and 19, for example, one adjustment serves to locate the respective pins 99, 109, 120 and 131 properly in the log. $p$ slots and at the same time to adjust the sleeves on the temperature arms correctly.

In the devices of Figs. 2, 5, 14 and 26, the length of the piston rod should be adjusted so that the distance from the center of the sleeve to the plane passing through the origin is equal at atmospheric pressure to the atmospheric pressure measured by the scale of the indicator spring. Such adjustment is obtained in the apparatus of Figs. 15 to 19 inclusive and Figs. 24 and 27 when making the previously described adjustment.

The value of $k$ for diatomic gases, such as $N_2$, $O_2$, air, $H_2$, etc., is approximately 1.40–1.41. For more complex molecular structures it is smaller, so that in gas engine charges after combustion, containing, as they do, large quantities of $CO_2$ and superheated $H_2O$, it follows that the average value of $k$ for the mixture will be smaller than 1.40 and that its actual value will depend upon the relative proportions of the various constituents comprising the gaseous mixture. Practice has shown that this value of $k$ ordinarily ranges from 1.36 to 1.40. To be applicable to all ordinary engineering uses, the indicators and projectors may be supplied with sets of logarithmic slots constructed for the various common values of $k$.

The pressure variations and the volume variations of a gas are the properties most susceptible of direct measurement and utilization in producing the displacements requisite for the delineation of the various curves described. In cases, however, where it is difficult to measure directly either the volume or the pressure, or where it is desired to make direct measurement of the temperature, suitable displacements or motions may be derived directly from a temperature responsive device such as an oscillograph in circuit with a resistance filament or ribbon exposed to the gas or other suitable instrument for recording or indicating slight temperature variations in a fluid body. These temperature displacements thus secured may be utilized in conjunction with pressure, volume or entropy displacements and according to the general principles herein stated to delineate any two of the four described properties of the gas. For example, a gas may be confined in some holder of irregular shape, such that the volume fluctuations are not measurable quantities or can be measured only with difficulty. Under such conditions temperature variations of the gas can be utilized to move a needle or a mirror by means of a thermo-electric couple or by the above-described method in such manner that the displacement of the needle or of the ray of light can be compounded with other displacements proportional to the pressure variations to produce resultant displacements proportional to entropy and volume variations and secure any possible curve representing the relations of the four mentioned properties of the gas. The same method of direct temperature displacement may be employed where the pressure variation is difficult to obtain through inaccessibility or by reason of the pressure variations being too small to measure accurately, or where the volume of the gas is so small that the use of an indicator cylinder and its pipe connections would introduce too large an error in the volume.

In Fig. 28, I have shown by way of illustration, an optical apparatus for recording the temperature-entropy variations by means of displacements produced directly from the temperature and volume variations. For the purpose of measuring the temperature variations, a sensitive galvanometer 181 may be employed, the latter being provided with a mirror 182 suitably suspended to provide for its deflection in response to current variations in the circuit 183. The latter may have in series a source of electro-motor force such as the battery 184 and the very thin resistance ribbon 185. By suitably selecting the metal of which the ribbon is composed and designing the circuit so that the ribbon comprises a large proportion of the total resistance of the circuit, the resistance of the ribbon and the current in the circuit may be made to vary with the temperature changes in the ribbon, so that when the latter is introduced into the engine cylinder, or other gas container, the galvanometer mirror will undergo deflections proportional to the temperature changes in the gas. These deflections and displacements may be availed of to produce a record providing a source of light such as the electric arc 186, the light from which passes through a suitable slit 187 and strikes the face of the mirror, being thereby reflected upon the screen 188 in the form of a vertical line. The screen is preferably curved so as to have all points equidistant from the mirror and thereby avoid distortion. The screen overlies a holder 189 adapted to hold the sensitive film 190 so that the ray of light, which is allowed to pass through an appropriately formed slot 191 in the screen, will trace a curve dependent upon the swinging displacement of the mirror and the vertical displacement of the screen.

The screen is mounted for vertical movement upon the upright carrier rod 192, the latter having the arm or bracket 193 in which is formed the slot 194, shaped in conformance to the expression $(k-1)$ log. $v$. The volume director 195, having a suitable connection to the cross head as heretofore, is adapted to slide along the guide rod 196 and carries the laterally projecting pin 197 which enters the slot 194 and causes the vertical displacement of the screen as the volume of the gas in the engine cylinder changes. By reason of the shape of the slot 194, the screen is displaced vertically in proportion to $(k-1)$ log. $v$ and in virtue of the slot 191 which is shaped to conform to log. $T$, the record produced upon the film shows variations in the temperature along a horizontal axis and variations in the entropy along a vertical axis.

It will be obvious that suitable screens will be provided in the actual embodiment of the instrument to protect both the film and the galvanometer from extraneous light.

The described form of galvanometer is merely illustrative of any form of direct measuring device for securing displacements from a direct measurement of the temperature and utilizing them in accordance with the principles of my invention.

While I have herein shown a number of different embodiments of the invention and many more might be illustrated, were it deemed advisable, it will be understood that these are simply for the illustration of the fundamental and generic principles underlying their construction and utilization in each case.

While I have herein shown and described devices intended to trace or draw permanent records of the gaseous properties referred to, the invention is not limited to the delineation of the properties of a gas in the form of permanent records, but the same may be utilized to delineate the characteristics of a gas momentarily, or in visual outlines which are not permanent in their nature.

Claims—

1. In a recording apparatus for recording the entropy variations of a gas the combination with means responsive to the pressure variations thereof of means responsive to the volume variations and means actuated by said two responsive means for automatically recording in units of entropy the entropy variations of the gas.

2. In a recording apparatus for recording the temperature variations of a gas the combination with means responsive to the pressure variations thereof of means responsive to the volume variations and means actuated by said two responsive means for automatically recording the temperature variations of the gas.

3. In an indicator the combination with a marker of a recording surface, a pressure-actuated director, a volume director and a logarithmic director for transmitting the movement of one of said directors to produce a relative displacement between the marker and recording surface.

4. In a recording apparatus the combination with a follower of a pair of directors movable simultaneously but independently, connections for imparting a movement to said follower proportional to the movement of one director, and means for imparting to said follower a movement at right angles thereto derived from the joint movements of said directors.

5. In a recording apparatus the combination with a follower of a pair of directors movable simultaneously but independently and connections for imparting to said follower a movement proportional to the product of the movements of said two directors.

6. In a recording apparatus the combination with a marker of a recording surface, a pair of directors movable simultaneously but independently, a connection for producing mutually perpendicular, relative movements between said marker and recording surface and a logarithmic director for deriving one of said movements from the movement of a director.

7. In an apparatus for recording temperature variations of a gas, the combination with a marker of a recording surface, directing means responsive to the pressure variations of said gas, directing means responsive to the volume variations thereof, means for producing between said marker and said recording surface a relative movement proportional to the movement of one of said directing means, and means for producing a relative movement at right angles thereto proportional to the product of the movements of said two directing means.

8. In a recording device for recording variations in characteristic properties of a gas, the combination with pressure following means and volume following means of recording means actuated thereby for recording in units of entropy.

9. In a recording apparatus for recording variations in characteristic properties of a gas, the combination with pressure and volume following means of recording means actuated thereby for recording in units of temperature.

10. In an indicator the combination with pressure responsive means, volume responsive means, a recording surface, a recording medium and means controlled by the pressure responsive means and volume responsive means for recording variations in entropy in units of entropy.

11. In a recording device the combination with a pair of movable directors responsive each to variations in a measurable property of a gas of a recording medium and a recording surface and means for producing two mutually perpendicular relative movements between the said medium and surface, one of which is derived from the combined movements of the said directors.

12. In a recording device the combination with a pair of movable directors responsive each to variations in a measurable property of a gas of a recording medium and recording surface, and means for producing a relative movement between said medium and surface proportional to entropy variations in the gas and derived from the combined movements of the said directors.

13. In a recording device the combination with a logarithmic director of means for moving the same in response to pressure variations of a gas and adjustable connections between the director and the moving means.

14. In a recording device the combination with a pair of directors, moving means for each director responsive to variations in a measurable property of a gas, a recording medium and recording sheet, means for producing mutually perpendicular relative movements between said medium and sheet, one of which is derived from the combined movements of said directors and an adjustable connection between moving means and its director.

15. In an indicator for recording variations of the properties of a gas the combination with pressure responsive means of volume responsive means, means actuated thereby for recording entropy variations and means for adjusting the initial position of the volume responsive means to bear a fixed relation to the zero position of the recording means.

16. In an indicator for recording variations of the properties of a gas the combination with pressure responsive means of volume responsive means, means actuated thereby for recording temperature variations and means for adjusting the initial position of the volume responsive means to bear a fixed relation to the zero position of the indicator.

17. In an indicator the combination with pressure responsive means of volume responsive means, directing means for converting the movement of said responsive means into a different movement, and a scale for adjusting the initial position of the volume responsive means relatively to the directing means.

18. In an indicator the combination with means recording the entropy variations of a gas, such means including a reciprocatory volume director and means for changing the length of the stroke of the said volume director.

19. In an indicator the combination with pressure responsive means, a swinging director operated thereby, volume responsive means and adjustable connections between said swinging director and one of said responsive means.

20. In a recorder the combination with a recording medium and a recording surface of devices responsive to variations in two properties of a gas, means to impart relative movement to said recording medium and recording surface from said responsive devices, and adjusting means for adjusting the said responsive devices so that the total displacement of each responsive device is proportional to the total value of the respective characteristic property, to the variations of which it responds.

21. In a recording mechanism the combination with a recording medium and a recording surface of two responsive devices actuated by variations in two characteristic properties of a gas, means for imparting to said recording medium and surface from said responsive devices two relative displacements, one of which is proportional to entropy variations of a gas, and regulating means for adjusting said responsive devices so that their total displacements shall always be proportional to some function of the total values of the responsive characteristic properties.

22. In a recording device the combination with a director of means for moving the same in response to logarithmic variations of the gas, and adjustable connections between the director and the moving means.

In testimony whereof, I have signed my name to this specification, in the presence of two subscribing witnesses.

CHARLES W. BERRY.

Witnesses:
THOMAS B. BOOTH,
EVERETT S. EMORY.